(12) United States Patent
Kim et al.

(10) Patent No.: US 12,217,915 B2
(45) Date of Patent: Feb. 4, 2025

(54) MULTILAYER ELECTRONIC COMPONENT

(71) Applicant: SAMSUNG ELECTRO-MECHANICS CO., LTD., Suwon-si (KR)

(72) Inventors: Hwi Dae Kim, Suwon-si (KR); Se Hwa Jeong, Suwon-si (KR); Young Ghyu Ahn, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 129 days.

(21) Appl. No.: 18/079,438

(22) Filed: Dec. 12, 2022

(65) Prior Publication Data

US 2023/0207220 A1    Jun. 29, 2023

(30) Foreign Application Priority Data

Dec. 28, 2021   (KR) .................. 10-2021-0189811
Oct. 19, 2022   (KR) .................. 10-2022-0135054

(51) Int. Cl.
*H01G 4/30*       (2006.01)
*H01G 2/06*       (2006.01)
(Continued)

(52) U.S. Cl.
CPC ............... *H01G 4/30* (2013.01); *H01G 2/065* (2013.01); *H01G 4/012* (2013.01); *H01G 4/12* (2013.01); *H01G 4/224* (2013.01); *H01G 4/232* (2013.01)

(58) Field of Classification Search
CPC .......... H01G 4/30; H01G 2/065; H01G 4/012; H01G 4/12; H01G 4/224; H01G 4/232
(Continued)

(56) References Cited

U.S. PATENT DOCUMENTS 8,531,817 B2 *   9/2013   Yoshida ............... H01C 1/1413
                                                      361/321.1
8,995,109 B1 *   3/2015   Tsutsumi ............... B32B 37/24
                                                      361/301.4
(Continued)

FOREIGN PATENT DOCUMENTS

JP           10097942 A  *  4/1998
JP        2009-253010 A     10/2009
(Continued)

*Primary Examiner* — Arun Ramaswamy
(74) *Attorney, Agent, or Firm* — MORGAN, LEWIS & BOCKIUS LLP

(57) ABSTRACT

A multilayer electronic component includes: a body including dielectric layers and internal electrodes alternately disposed with the dielectric layers interposed therebetween in a first direction; and external electrodes connected to the internal electrodes. The body has first and second surfaces opposing each other in the first direction and one or more side surfaces positioned between the first and second surfaces. The body has a protruding portion protruding in the first direction and outer peripheral portions around the protruding portion on the first surface of the body. The external electrodes cover the outer peripheral portions, the side surfaces, and the second surface of the body. In the second surface of the body, portions that are covered by the external electrodes and a portion that is not covered by the external electrodes are substantially coplanar with each other.

31 Claims, 10 Drawing Sheets

(51) Int. Cl.
  *H01G 4/012*    (2006.01)
  *H01G 4/12*     (2006.01)
  *H01G 4/224*    (2006.01)
  *H01G 4/232*    (2006.01)

(58) Field of Classification Search
  USPC .................. 361/301.4, 306.3, 321.1, 321.3
  See application file for complete search history.

(56) References Cited

U.S. PATENT DOCUMENTS

| | | |
|---|---|---|
| 2009/0284896 A1 | 11/2009 | Sakaguchi et al. |
| 2010/0157507 A1* | 6/2010 | Matsumoto .............. H01G 4/30 |
| | | 361/306.3 |
| 2015/0084481 A1* | 3/2015 | Mori ...................... H01G 4/252 |
| | | 29/829 |
| 2016/0268047 A1 | 9/2016 | Shin et al. |
| 2016/0284471 A1 | 9/2016 | Mizuno et al. |
| 2017/0278634 A1 | 9/2017 | Kato |
| 2018/0027658 A1 | 1/2018 | Choi et al. |
| 2018/0108479 A1* | 4/2018 | Sato ........................ H01G 4/12 |

FOREIGN PATENT DOCUMENTS

| | | | |
|---|---|---|---|
| JP | 2015015500 A | * | 1/2015 |
| JP | 2017-175037 A | | 9/2017 |
| JP | 2018-014482 A | | 1/2018 |
| KR | 10-2016-0108905 A | | 9/2016 |
| KR | 10-1876621 B1 | | 7/2018 |

* cited by examiner

MULTILAYER ELECTRONIC COMPONENT

CROSS-REFERENCE TO RELATED APPLICATION(S)

This application claims benefit of priority to Korean Patent Application Nos. 10-2021-0189811 filed on Dec. 28, 2021 and 10-2022-0135054 filed on Oct. 19, 2022 in the Korean Intellectual Property Office, the disclosures of which are incorporated herein by reference in their entireties.

TECHNICAL FIELD

The present disclosure relates to a multilayer electronic component.

BACKGROUND

A multilayer ceramic capacitor (MLCC), a multilayer electronic component, is a chip-type capacitor mounted on the printed circuit boards of various types of electronic products such as an image display device, for example, a liquid crystal display (LCD) or a plasma display panel (PDP), a computer, a smartphone, a mobile phone, and the like, to serve to charge or discharge electricity therein or therefrom.

The multilayer ceramic capacitor may be used as components of various electronic apparatuses since it has a small size, implements high capacitance, and may be easily mounted. In accordance with miniaturization and an increase in output of various electronic apparatuses such as computers and mobile devices, a demand for miniaturization and a capacitance increase of the multilayer ceramic capacitors has increased.

In addition, recently, in accordance with an increase of an interest in electronic components for a vehicle in the industry, the multilayer ceramic capacitor has also been required to have a high reliability characteristic in order to be used in the vehicle or an infotainment system.

In a case in which the size of the multilayer ceramic capacitor is decreased, an area by which internal electrodes face each other is reduced, so that it is difficult to implement a sufficient capacitance. In this regard, attempts have been made to increase a dielectric constant of a dielectric or to thin the internal electrodes and dielectric layers to thereby increase the capacitance of the multilayer ceramic capacitor.

Meanwhile, from the structural point of view, an attempt has been made to form external electrodes in the form of electrodes to reduce a size of a portion other than a capacitance forming portion. In this case, a proportion of the capacitance forming portion in the entire multilayer ceramic capacitor may be significantly increased, which is effective in increasing the capacitance.

SUMMARY

An aspect of the present disclosure may increase a capacitance per unit volume of a multilayer electronic component.

Another aspect of the present disclosure may prevent reliability deterioration that may occur in a case in which a proportion of external electrodes is significantly reduced to increase a capacitance per unit volume.

However, an aspect of the present disclosure is not limited thereto, and may be more easily understood in a process of describing exemplary embodiments in the present disclosure.

According to an aspect of the present disclosure, a multilayer electronic component may include: a body including dielectric layers and internal electrodes alternately disposed with the dielectric layers interposed therebetween in a first direction; and external electrodes connected to the internal electrodes. The body may have first and second surfaces opposing each other in the first direction and one or more side surfaces positioned between the first and second surfaces. The body may include a protruding portion protruding in the first direction and outer peripheral portions around the protruding portion on the first surface of the body. The external electrodes may cover the outer peripheral portions, the side surfaces, and the second surface of the body. In the second surface of the body, portions that are covered by the external electrodes and a portion that is not covered by the external electrodes may be substantially coplanar with each other.

According to another aspect of the present disclosure, a multilayer electronic component may include: a body including dielectric layers and internal electrodes alternately disposed with the dielectric layers interposed therebetween in a first direction; and external electrodes connected to the internal electrodes. The body may have first and second surfaces opposing each other in the first direction and one or more side surfaces positioned between the first and second surfaces. The body may include a first protruding portion protruding in the first direction, first outer peripheral portions around the first protruding portion on the first surface of the body, a second protruding portion protruding in the first direction, and second outer peripheral portions around the second protruding portion at the second surface of the body. The first protruding portion and the second protruding portion may have different shapes from each other.

According to another aspect of the present disclosure, a multilayer electronic component may include: a body including dielectric layers and internal electrodes alternately disposed with the dielectric layers interposed therebetween in a first direction; and an external electrode connected to one or more of the internal electrodes. The body may have first and second surfaces opposing each other in the first direction and a side surface positioned between the first and second surfaces. The external electrode may be disposed on the side surface and include a first portion and a second portion at least partially overlapping each other in the first direction. A center portion of the first surface may protrude with respect to the first portion in the first direction. The second portion of the external electrode may extend on the second surface, and protrude with respect to a center portion of the second surface in the first direction.

According to another aspect of the present disclosure, a multilayer electronic component may include: a body including dielectric layers and internal electrodes alternately disposed with the dielectric layers interposed therebetween in a first direction; and an external electrode connected to one or more of the internal electrodes. The body may have first and second surfaces opposing each other in the first direction and a side surface positioned between the first and second surfaces. The body may include a first protruding portion protruding in the first direction and first outer peripheral portions disposed on opposing sides of the first protruding portion in a second direction. The external electrode may be disposed on the side surface of the body, and extend to be in contact with and end at a side surface of the first protruding portion.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Figure 1:
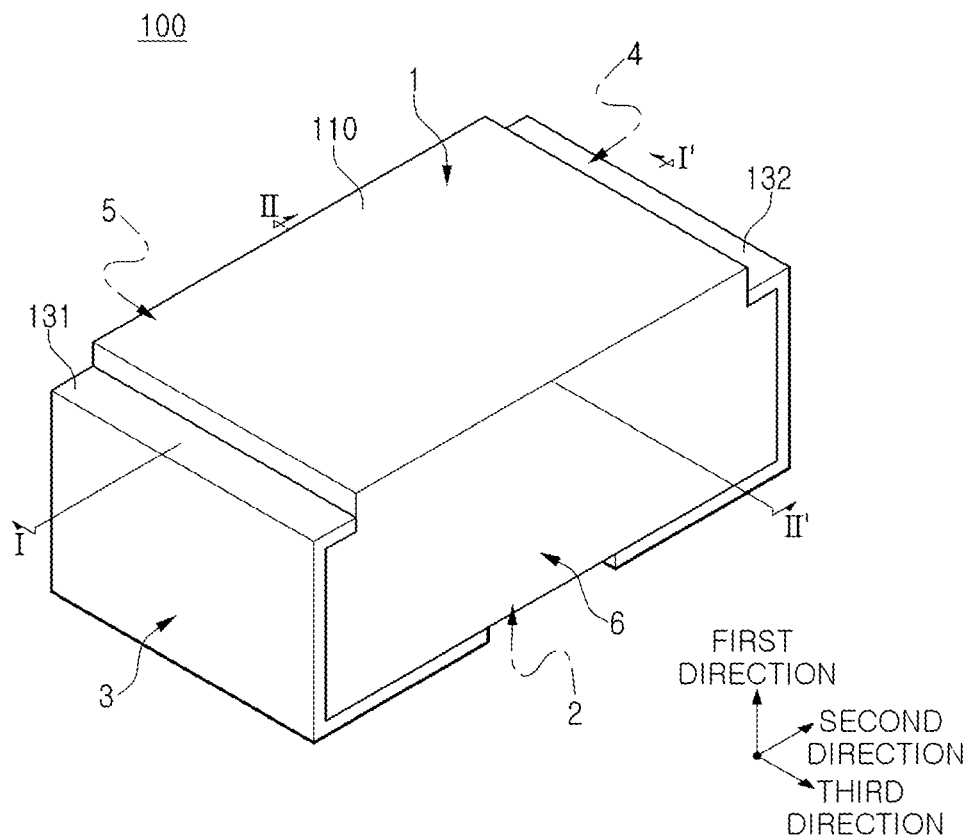
FIG. 1 is a schematic perspective view illustrating a multilayer electronic component according to an exemplary embodiment in the present disclosure.

Hereinafter, exemplary embodiments of the present disclosure will now be described in detail with reference to the accompanying drawings.

In the drawings, a first direction may be used as a thickness direction or a T direction, a second direction may be used as a length direction or an L direction, and a third direction may be used as a width direction or a W direction.

FIG. 1 is a schematic perspective view illustrating a multilayer electronic component according to an exemplary embodiment in the present disclosure.

Figure 2:
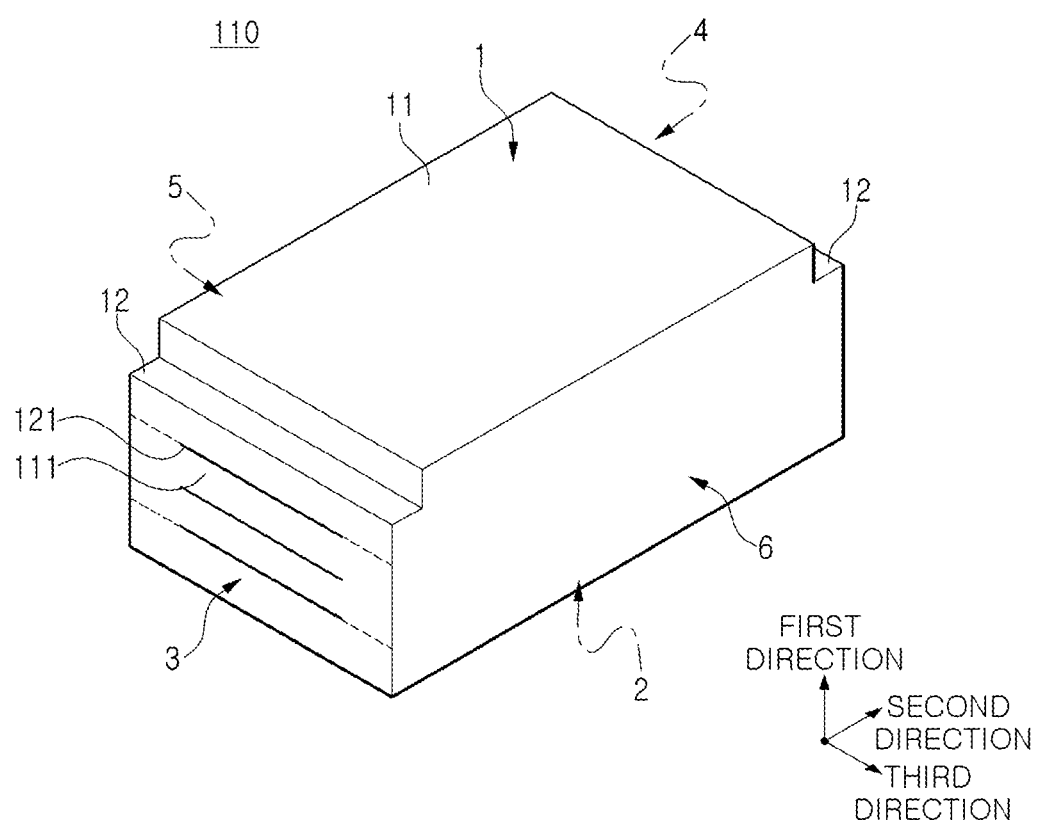
FIG. 2 is a schematic perspective view of a body according to an exemplary embodiment in the present disclosure.

FIG. 2 is a schematic perspective view of a body according to an exemplary embodiment in the present disclosure.

Figure 3:
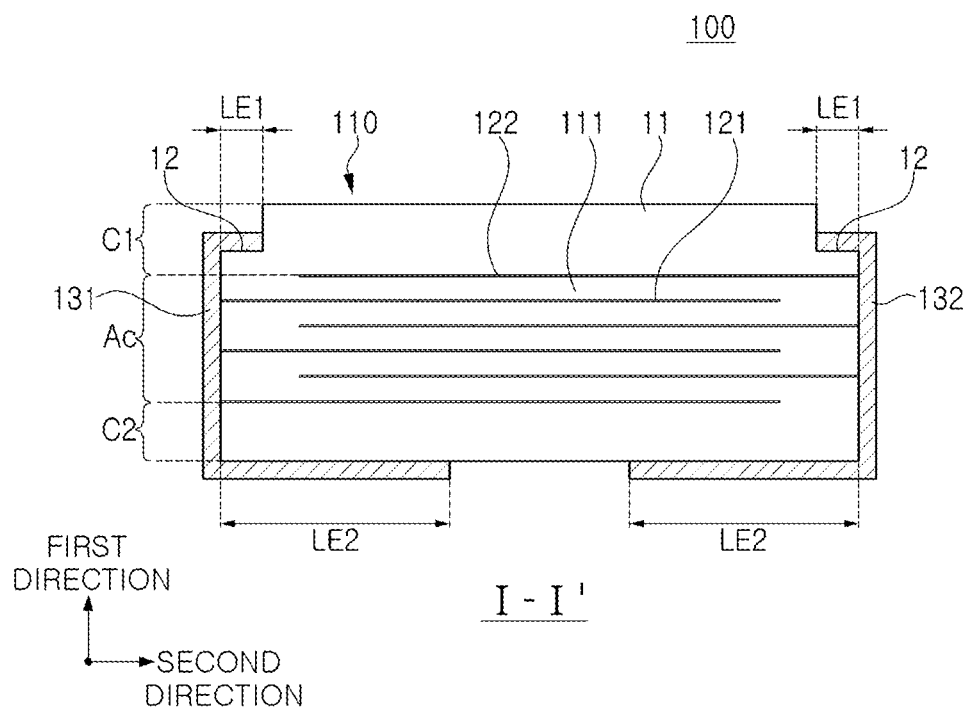
FIG. 3 is a cross-sectional view taken along line I-I' of FIG. 1.

FIG. 3 is a cross-sectional view taken along line I-I' of FIG. 1.

Figure 4:
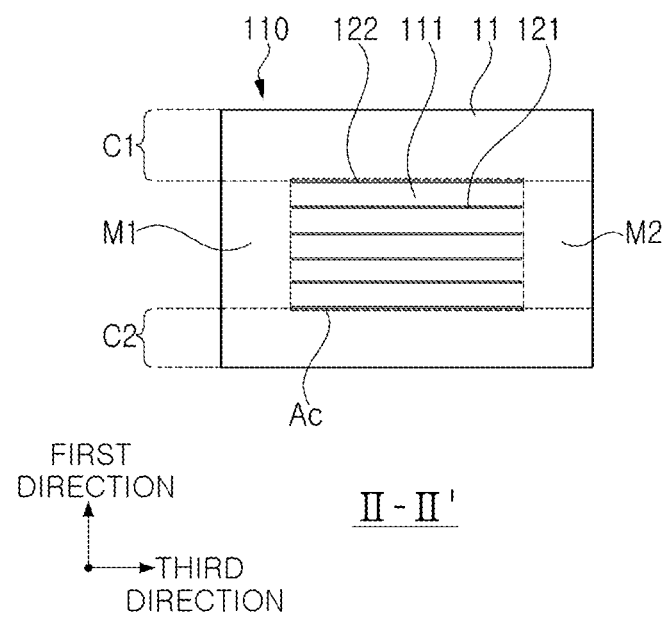
FIG. 4 is a cross-sectional view taken along line II-II' of FIG. 1.

FIG. 4 is a cross-sectional view taken along line II-II' of FIG. 1.

Hereinafter, a multilayer electronic component 100 according to an exemplary embodiment in the present disclosure will be described with reference to FIGS. 1 through 4.

The multilayer electronic component 100 according to an exemplary embodiment in the present disclosure may include a body 110 including dielectric layers 111 and internal electrodes 121 and 122 alternately disposed with the dielectric layers 111 interposed therebetween in a first direction; and external electrodes 131 and 132 connected to the internal electrodes 121 and 122, in which the body 110 may have first and second surfaces 1 and 2 opposing each other in the first direction and one or more side surfaces 3 and 4 positioned between the first and second surfaces 1 and 2, a protruding portion 11 protruding in the first direction and outer peripheral portions 12 around the protruding portion 11 may be formed on the first surface 1 of the body 110, and the external electrodes 131 and 132 may cover the outer peripheral portions 12, the side surfaces 3 and 4, and the second surface 2 of the body 110. Further, in the second surface 2 of the body 110, portions that are covered by the external electrodes 131 and 132 and a portion that is not covered by the external electrodes 131 and 132, that is, portions that overlap the external electrodes 131 and 132 in the first direction and a portion that does not overlap the external electrodes 131 and 132 in the first direction, may be substantially coplanar with each other. The configuration of being substantially coplanar may include the configuration in which objects are completely disposed on a coplanar plane, and also the configuration in which objects are disposed on an almost coplanar plane due to a process error. That is, a minute difference due to a process error, recognizable by one of ordinary skill in the art, may be included. This may mean that the protruding portion 11 of the body 110 is formed at the first surface 1 while not formed in the second surface 2. As a specific example, as will be described later, surfaces of portions of the external electrodes 131 and 132 that cover the second surface 2 of the body 110 may be positioned more toward the outside in the first direction than a portion of the second surface 2 of the body 110 that is not covered by the external electrodes 131 and 132 is. The technical meaning of such a one-way protruding structure of the body 110 will be described later.

Referring to FIG. 2, in the body 110, the dielectric layers 111 and the internal electrodes 121 and 122 are alternately disposed in the first direction.

The body 110 may have the first and second surfaces 1 and 2 opposing each other in the first direction, and one or more side surfaces 3, 4, 5, and 6 connected to the first and second surfaces 1 and 2 and positioned between the first and second surfaces 1 and 2. According to the present exemplary embodiment, the body 110 may have four side surfaces 3, 4, 5, and 6, but the number of side surfaces may be less or more than four.

Among the side surfaces of the body 110, a third surface 3 and a fourth surface 4 may be disposed to oppose each other in the second direction perpendicular to the first direction, and a fifth surface 5 and a sixth surface 6 may be connected to the first to fourth surfaces 1, 2, 3, and 4 and oppose each other in the third direction perpendicular to the first and second directions.

A plurality of dielectric layers 111 forming the body 110 may be in a sintered state, and adjacent dielectric layers 111 may be integrated with each other so that boundaries therebetween are not readily apparent without using a scanning electron microscope (SEM).

A raw material of the dielectric layer 111 is not particularly limited as long as a sufficient capacitance may be obtained. For example, a barium titanate-based material, a lead composite perovskite-based material, a strontium titanate-based material, or the like, may be used as the raw material of the dielectric layer 111. The barium titanate-based material may include $BaTiO_3$-based ceramic powders. Examples of the $BaTiO_3$-based ceramic powders may include $BaTiO_3$ and $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1 and 0<y<1), $Ba(Ti_{1-y}Zr_y)O_3$ (0<y<1), or the like, in which calcium (Ca), zirconium (Zr), or the like, is partially solid-dissolved in $BaTiO_3$.

In addition, the raw material of the dielectric layer 111 may include various ceramic additives, organic solvents, binders, dispersants, and the like, added to powders such as barium titanate ($BaTiO_3$) powders, or the like, according to an object of the present disclosure.

The body 110 may include first and second internal electrodes 121 and 122 disposed in the body 110 in such a way as to face each other with each of the dielectric layers 111 interposed therebetween. In this case, the body 110 may include a capacitance forming portion Ac including the first internal electrodes 121 and the second internal electrodes 122 and forming a capacitance, and cover portions C1 and C2 formed on upper and lower sides of the capacitance forming portion Ac in the first direction, respectively.

In addition, the capacitance forming portion Ac, which contributes to forming a capacitance of a capacitor, may be formed by repeatedly stacking a plurality of first and second internal electrodes 121 and 122 with each of the dielectric layers 111 interposed therebetween.

The cover portions C1 and C2 may include an upper cover portion C1 disposed on the upper side of the capacitance forming portion Ac in the first direction and a lower cover portion C2 disposed on the lower side of the capacitance forming portion Ac in the first direction.

The upper cover portion C1 and the lower cover portion C2 may be formed by stacking a single dielectric layer or two or more dielectric layers on upper and lower surfaces of the capacitance forming portion Ac, respectively, in the thickness direction, and may basically serve to prevent damage to the internal electrodes due to physical or chemical stress.

The upper cover portion C1 and the lower cover portion C2 do not have to include the internal electrodes, and may include the same material as the dielectric layer 111.

That is, the upper and lower cover portions C1 and C2 may include a ceramic material such as a barium titanate ($BaTiO_3$)-based ceramic material.

According to the present embodiment, since the protruding portion 11 and the outer peripheral portions 12 may be formed on the first surface 1 of the body 110, the upper cover portion C1 may include the protruding portion 11 and the outer peripheral portions 12.

Further, margin portions M1 and M2 may be disposed on side surfaces of the capacitance forming portion Ac.

The margin portions M1 and M2 may include the first margin portion M1 disposed at the fifth surface 5 of the body 110 and the second margin portion M2 disposed at the sixth surface 6. That is, the margin portions M1 and M2 may be disposed at the side surfaces 5 and 6 of the body 110 opposing each other in the third direction.

The margin portions M1 and M2 may refer to regions between both distal ends of the first and second internal electrodes 121 and 122 and boundary surfaces of the body 110 in a cross section of the body 110 in the first and third directions as illustrated in FIG. 4.

The margin portions M1 and M2 may basically serve to prevent damage to the internal electrodes due to physical or chemical stress.

The margin portions M1 and M2 may be formed by applying a conductive paste onto ceramic green sheets except for places where the margin portions are to be formed to form the internal electrodes.

Alternatively, in order to suppress a step due to the internal electrodes 121 and 122, the margin portions M1 and M2 may be formed by stacking the internal electrodes, cutting the stacked internal electrodes in such a way that the internal electrodes are exposed to the side surfaces 5 and 6 of the body 110, and then stacking a single dielectric layer or two or more dielectric layers on opposite side surfaces of the capacitance forming portion Ac in the third direction (width direction).

The internal electrodes 121 and 122 may be stacked alternately with the dielectric layer 111.

The internal electrodes 121 and 122 may include the first and second internal electrodes 121 and 122, and the first and second internal electrodes 121 and 122 may be alternately disposed with each of the dielectric layers 111 forming the body 110 interposed therebetween and face each other in the first direction. In addition, as will be described later, the first and second internal electrodes may be exposed to the side surfaces 3 and 4 of the body 110, respectively.

Referring to FIG. 3, the first internal electrodes 121 may be spaced apart from the fourth surface 4 and be exposed through (or be in contact with or extend to) the third surface 3, and the second internal electrodes 122 may be spaced apart from the third surface 3 and be exposed through (or be in contact with or extend to) the fourth surface 4. The first external electrode 131 may be disposed on the third surface 3 of the body and be connected to the first internal electrodes 121, and the second external electrode 132 may be disposed on the fourth surface 4 of the body and be connected to the second internal electrodes 122. That is, the first internal electrodes 121 may be spaced apart from the fourth surface 4 by a predetermined distance in the second direction, and the second internal electrodes 122 may be spaced apart from the third surface 3 by a predetermined distance in the second direction.

According to an exemplary embodiment, the internal electrodes 121 and 122 may extend to the side surfaces 3 and 4 of the body 110. Specifically, the first internal electrodes 121 may extend to the third surface 3 of the body 110, and the second internal electrodes 122 may extend to the fourth surface 4 of the body 110. Therefore, the first internal electrodes 121 may be connected to the first external electrode 131 to be described later, and the second internal electrodes 122 may be connected to the second external electrode 132 to be described later.

A material of each of the internal electrodes 121 and 122 is not particularly limited, and may be a material having excellent electrical conductivity. For example, the internal electrodes 121 and 122 may contain one or more of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for an internal electrode containing one or more of nickel (Ni), copper (Cu), palladium (Pd), silver (Ag), gold (Au), platinum (Pt), tin (Sn), tungsten (W), titanium (Ti), and alloys thereof on ceramic green sheets. A method of printing the conductive paste for an internal electrode may be a screen-printing method, a gravure printing method, or the like, but is not limited thereto.

The external electrodes 131 and 132 may be connected to the internal electrodes 121 and 122, respectively.

The external electrodes 131 and 132 may include the first external electrode 131 disposed on the third surface 3 of the body 110, and the second external electrode 132 disposed on the fourth surface 4 of the body 110. The first external electrode 131 may be connected to the first internal electrodes 121, and the second external electrode 132 may be connected to the second internal electrodes 122.

A structure in which the multilayer electronic component 100 includes two external electrodes 131 and 132 has been described in the present exemplary embodiment, but the number, shapes or the like, of external electrodes 131 and 132 may be changed depending on shapes of the internal electrodes 121 and 122 or other purposes.

The external electrodes 131 and 132 may be disposed on the side surfaces 3 and 4 of the body 110, respectively, and cover the first and second surfaces 1 and 2 of the body 110. Specifically, the external electrodes 131 and 132 may extend from the side surfaces 3 and 4 to portions of the first and second surfaces 1 and 2 of the body 110.

Meanwhile, the external electrodes 131 and 132 do not need to completely cover the first surface 1 or the second surface 2 of the body 110, and the first external electrode 131 and the second external electrode 132 may be spaced apart from each other in the second direction by a predetermined distance.

Meanwhile, the external electrodes 131 and 132 may be formed of any material having electrical conductivity, such as a metal, a specific material of each of the external electrodes 131 and 132 may be determined in consideration of an electrical characteristic, structural stability, and the like, and the external electrodes 131 and 132 may have a multilayer structure.

For example, the external electrodes 131 and 132 may include electrode layers disposed on the body 110 and plating layers formed on the electrode layers, respectively.

As a more specific example of the electrode layer, the electrode layer may be a sintered electrode including a conductive metal and glass or a resin-based electrode including a conductive metal or a resin.

Alternatively, the electrode layer may have a form in which a sintered electrode and a resin electrode are sequentially formed on the body. In addition, the electrode layer may be formed in a manner of transferring a sheet including a conductive metal onto the body or be formed in a manner of transferring a sheet including a conductive metal onto a sintered electrode.

The conductive metal included in the electrode layer may be a material having excellent electrical connectivity, but is not particularly limited thereto. For example, the conductive metal may be one or more of nickel (Ni), copper (Cu), and alloys thereof.

The plating layer serves to improve mounting characteristics. A type of the plating layer is not particularly limited, and the plating layer may be a plating layer including one or more of Ni, Sn, Pd, and alloys thereof, and may be formed as a plurality of layers.

As a more specific example of the plating layer, the plating layer may be a Ni plating layer or a Sn plating layer, may have a form in which a Ni plating layer and a Sn plating layer are sequentially formed on the electrode layer, or may have a form in which a Sn plating layer, a Ni plating layer, and a Sn plating layer are sequentially formed. Alternatively, the plating layer may include a plurality of Ni plating layers and/or a plurality of Sn plating layers.

In the multilayer electronic component 100 according to an exemplary embodiment in the present disclosure, the protruding portion 11 protruding in the first direction and the outer peripheral portions 12 around the protruding portion 11 may be formed at the first surface 1 of the body 110, and the external electrodes 131 and 132 may cover the outer peripheral portions 12, the side surfaces 3 and 4, and the second surface 2 of the body 110.

Accordingly, a proportion of the external electrodes in the entire component may be smaller than that in the related art in which the protruding portion 11 is not formed at the first surface 1 of the body 110, thereby increasing the capacitance per unit volume of the multilayer electronic component 100.

Meanwhile, in the related art in which the external electrodes 131 and 132 do not cover the first surface 1 of the body 110 to improve the capacitance per unit volume, distal ends of the external electrodes in the first direction and corners of the body 110 are exposed to the outside, and thus, the multilayer electronic component may be vulnerable to external impact or penetration of moisture.

On the other hand, according to an exemplary embodiment in the present disclosure, the protruding portion 11 protruding in the first direction and the outer peripheral portions 12 around the protruding portion 11 are formed at the first surface 1 of the body 110, and the external electrodes 131 and 132 cover the outer peripheral portions 12, the side surfaces 3 and 4, and the second surface 2 of the body 110, and thus, the corners of the body 110 and the distal ends of the external electrodes 131 and 132 in the first direction may be prevented from being directly exposed to the outside. As a result, the moisture resistance reliability of the multilayer electronic component 100 may be improved while increasing the capacitance per unit volume.

In addition, according to an exemplary embodiment in the present disclosure, the surfaces (surfaces facing downward in the drawings) of the portions of the external electrodes 131 and 132 that cover the second surface 2 of the body 110 may be positioned more toward the outside in the first direction than the portion of the second surface 2 of the body 110 that is not covered by the external electrodes 131 and 132 is.

According to an exemplary embodiment, the external electrodes 131 and 132 may cover the side surfaces and the first and second surfaces 1 and 2 of the body 110, a portion of the first surface 1 of the body 110 that is not covered by the external electrodes 131 and 132 may be positioned more toward the outside in the first direction than portions of the external electrodes 131 and 132 that cover the first surface 1 of the body 110, and the portions of the external electrodes 131 and 132 that cover the second surface 2 of the body 110 may be positioned more toward the outside in the first direction than the portion of the second surface of the body 110 that is not covered by the external electrodes 131 and 132.

Accordingly, the capacitance per unit volume of the multilayer electronic component 100 may be increased by significantly reducing the proportion of the external electrodes 131 and 132 in the entire component, and the moisture resistance reliability of the multilayer electronic component 100 may be improved by preventing the corners of the body 110 and the distal ends of the external electrodes in the first direction from being directly exposed to the outside.

According to an exemplary embodiment, areas of the first surface 1 and the second surface 2 of the body 110 covered by the external electrodes 131 and 132 may be different from each other. Accordingly, the proportion of the external electrodes in the entire component may be further significantly reduced, and since the external electrodes may be sufficiently formed to secure a fixing strength during mounting, the moisture resistance reliability and fixing strength may be improved.

According to an exemplary embodiment, the area of the second surface 2 of the body 110 covered by each of the external electrodes 131 and 132 may be larger than the area of the first surface 1 covered by each of the external electrodes 131 and 132. Accordingly, in a case in which the second surface 2 of the body 110 is a mounting surface, a sufficiently large contact area between solders and the external electrodes 131 and 132 may be secured to improve the mounting stability of the multilayer electronic component 100. In addition, as the area of the second surface 2 of the body 110 covered by each of the external electrodes 131 and 132 is relatively increased, the fixing strength between the external electrodes 131 and 132 and the body 110 may be sufficiently secured. On the other hand, the area of the first surface 1 of the body covered by each of the external electrodes may be minimized to reduce the proportion of the external electrodes in the entire component, thereby improving the capacitance per unit volume of the multilayer electronic component 100.

Although a case in which the second surface 2 of the body 110 is the mounting surface has been described in the exemplary embodiment, but the present disclosure is not limited thereto and may be similarly applied to a case in which the first surface 1 is the mounting surface.

Meanwhile, a magnitude relationship between the areas of the first surface 1 and the second surface 2 of the body 110 covered by the external electrodes 131 and 132 may be determined by measuring and comparing lengths of the external electrodes covering the first surface and the second surface of the body in the second direction in a cross section of the multilayer electronic component 100 in the first and second directions.

Specifically, referring to FIG. 3, the magnitude relationship between the areas may be determined by comparing LE1 and LE2, LE1 being the length of each of the external electrodes 131 and 132 covering the first surface 1 of the body 110 in the second direction, and LE2 being the length of each of the external electrodes 131 and 132 covering the second surface 2 of the body 110 in the second direction.

LE1 and LE2 may be values measured in a cross section of a central portion of the body 110 in the third direction in the first direction and the second direction, and more specifically, may be average values of values measured for a pair of external electrodes 131 and 132.

According to an exemplary embodiment, regions of the external electrodes 131 and 132 disposed on the outer peripheral portions 12 of the body 110 may be in contact with side surfaces of the protruding portion 11.

An edge at which the protruding portion 11 and the outer peripheral portion 12 are connected may be a point where physical and chemical stresses are concentrated when the protruding portion 11 and the outer peripheral portions 12 are formed. Therefore, it is difficult to form a dense microstructure at the edge at which the protruding portion 11 and the outer peripheral portion 12 are connected, and it may thus be relatively vulnerable to penetration of external moisture and plating solution than other surfaces of the body 110.

In addition, since the edge at which the protruding portion 11 and the outer peripheral portion 12 are connected is positioned close to the capacitance forming portion Ac, when external moisture or plating solution penetrates into the inside of the body 110, the external moisture or plating solution may more easily reach the capacitance forming portion Ac. Therefore, it may be difficult to secure the moisture resistance reliability and acid resistance of the multilayer electronic component 100.

According to an exemplary embodiment, the regions of the external electrodes 131 and 132 disposed on the outer peripheral portions 12 of the body 110 are in contact with the side surfaces of the protruding portion 11, and thus, the edges at which the protruding portion 11 and the outer peripheral portions 12 are connected may be covered by the external electrodes 131 and 132 to block a main penetration path of external moisture and plating solution, thereby improving the moisture resistance reliability and acid resistance of the multilayer electronic component 100.

According to an exemplary embodiment, the external electrodes 131 and 132 do not have to cover the protruding portion 11 of the body 110 in the first direction. Accordingly, the number of stacked internal electrodes 121 and 122 and dielectric layers 111 may be larger than that in another multilayer electronic component having the same maximum thickness, and thus, the capacitance per unit volume of the multilayer electronic component 100 may be further increased. In addition, since the distal ends of the external electrodes 131 and 132 may be prevented from being directly exposed to the outside, the moisture resistance reliability of the multilayer electronic component 100 may be improved.

As described above, in the second surface 2 of the body 110, the portions that are covered by the external electrodes 131 and 132 and the portion that is not covered by the external electrodes 131 and 132 may be substantially coplanar with each other. Accordingly, the second surface 2 of the body 110 may be a substantially flat surface without a protruding portion. According to the present exemplary embodiment, the first surface 1 of the body 110 has a shape in which the protruding portion is formed, whereas the second surface 2 of the body 110 has a flat shape. Therefore, it may be easy to identify a mounting direction of the multilayer electronic component 100.

Figure 5:
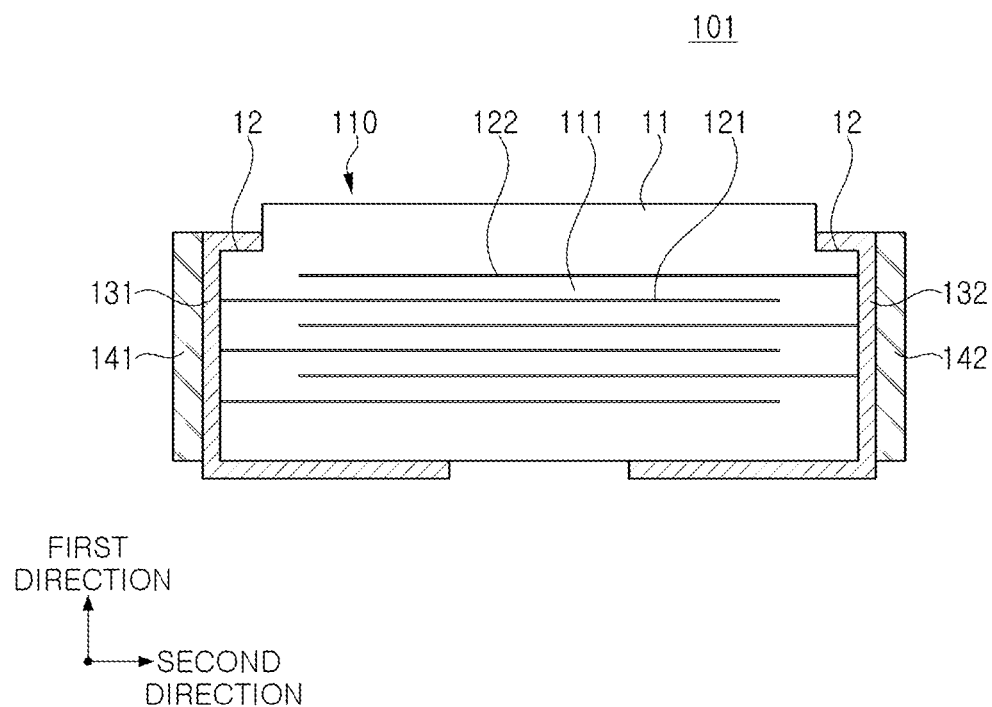
FIG. 5 is a cross-sectional view of a multilayer electronic component according to an exemplary embodiment in a first direction and a second direction.

FIG. 5 is a cross-sectional view of a multilayer electronic component 101 according to another exemplary embodiment in the first direction and the second direction.

Referring to FIG. 5, the multilayer electronic component 101 according to an exemplary embodiment may further include insulating layers 141 and 142 disposed on side surfaces of external electrodes 131 and 132.

When the multilayer electronic component 101 is mounted on a board, in a case in which the side surfaces of the external electrodes 131 and 132 are exposed to the outside, damage or a short circuit may occur due to adjacent multilayer electronic components and other electronic components. According to an exemplary embodiment, as the insulating layers 141 and 142 are disposed on the side surfaces of the external electrodes 131 and 132, a short circuit with an adjacent electronic component may be prevented when the multilayer electronic component 101 is mounted on a board.

Meanwhile, the insulating layers 141 and 142 may be formed of a material capable of preventing penetration of external moisture and protecting the multilayer electronic component 101 from other adjacent electronic components. In addition, the insulating layers 141 and 142 may be formed of a material capable of forming a thin and uniform film to easily increase a capacitance per unit volume of the multilayer electronic component 101. For example, the insulating layers 141 and 142 may include an oxide including at least one of Si, Al, Zr, or Ti, or an epoxy-based polymer material.

In addition, the insulating layers 141 and 142 may include a single component or a plurality of components, and more preferably, may include, as an additive, one or more selected from $BaTiO_3$, BaO, and the like to improve a bonding strength with the body 110 or the external electrodes 131 and 132.

A method of forming the insulating layers 141 and 142 may vary depending on components and purposes. For example, the method of forming the insulating layers 141 and 142 may include a method in which a coating film is formed with an insulating paste using a squeegee, and then each end surface of the external electrodes 131 and 132 is sequentially immersed and then dried, a sol-gel processing method, a chemical vapor deposition (CVD) method, and an atomic layer deposition (ALD) method, but is not limited thereto. Further, the insulating layers 141 and 142 may be formed by other methods capable of forming a thin and uniform insulating layer.

Figure 6:
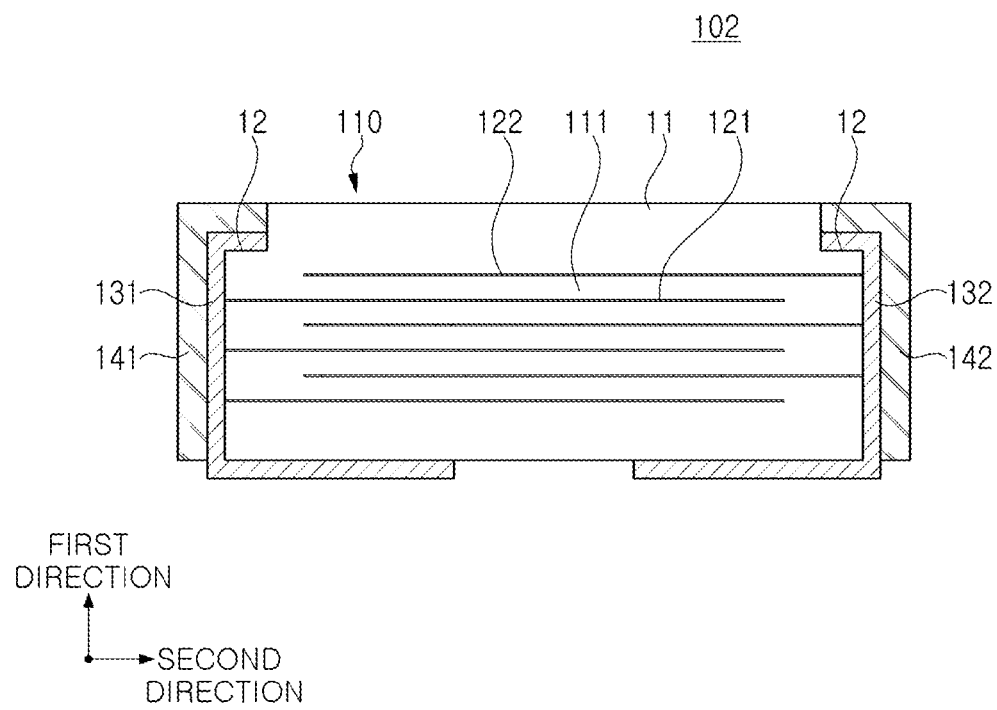
FIG. 6 is a cross-sectional view of a multilayer electronic component according to an exemplary embodiment in the first direction and the second direction.

FIG. 6 is a cross-sectional view of a multilayer electronic component 102 according to another exemplary embodiment in the first direction and the second direction.

Referring to FIG. 6, insulating layers 141 and 142 of the multilayer electronic component 102 according to an exemplary embodiment may extend from side surfaces of external electrodes 131 and 132 to portions of the external electrodes 131 and 132 that are disposed on outer peripheral portions 12 of a body 110. Accordingly, an edge at which a protruding portion 11 and the outer peripheral portion 12 are connected may be covered to block a moisture penetration path, thereby further improving the moisture resistance reliability.

From a similar point of view, the insulating layers 141 and 142 may extend to the portions of the external electrodes 131 and 132 that are disposed on the outer peripheral portions 12 of the body and may be in contact with side surfaces of the protruding portion 11 of the body, thereby significantly improving the moisture resistance reliability.

Figure 7:
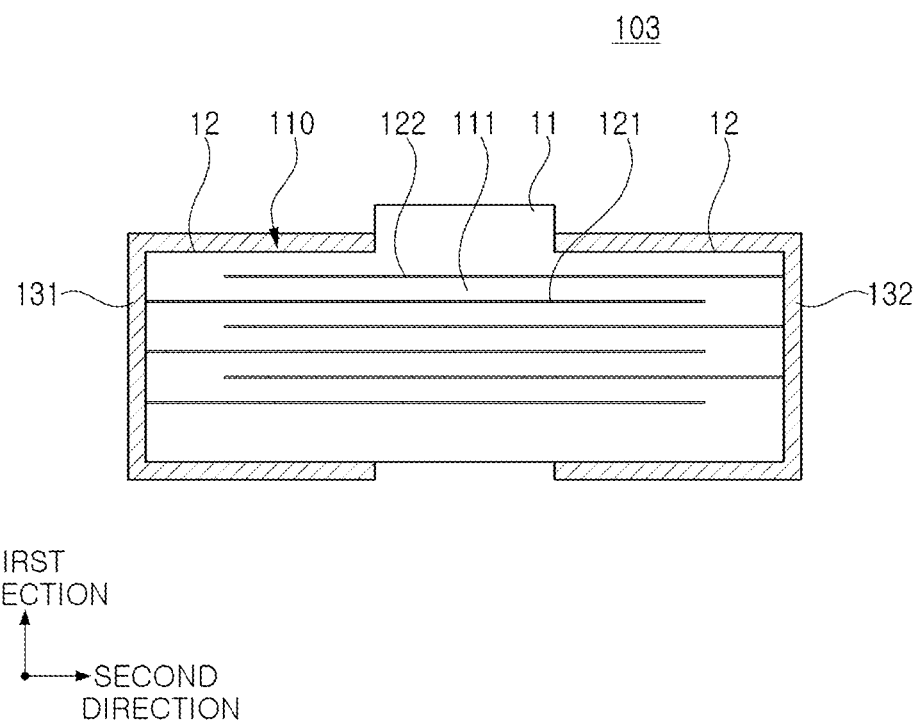
FIG. 7 is a cross-sectional view of a multilayer electronic component according to an exemplary embodiment in the first direction and the second direction.

FIG. 7 is a cross-sectional view of a multilayer electronic component 103 according to another exemplary embodiment in the first direction and the second direction.

Referring to FIG. 7, areas of a first surface 1 and a second surface 2 of a body 110 covered by external electrodes 131 and 132 of the multilayer electronic component 103 according to an exemplary embodiment may be substantially the same as each other. The configuration of areas being substantially the same may include the configuration in which the areas are completely the same, and also the configuration in which the areas are almost the same due to a process error. That is, a minute difference between the areas due to a process error, recognizable by one of ordinary skill in the art, may be included. Accordingly, a contact area between the body 110 and the first and second external electrodes 131 and 132 may be increased, and an unevenness of the body 110 may be covered with the first and second external electrodes 131 and 132. Therefore, a mechanical strength of the multilayer electronic component 103 may be improved.

Meanwhile, whether or not the areas of the first surface 1 and the second surface 2 of the body 110 covered by the external electrodes 131 and 132 are substantially the same as each other may be determined by measuring and comparing lengths of the external electrodes covering the first surface and the second surface of the body in the second direction in a cross section of the multilayer electronic component 103 in the first and second directions.

Figure 8:
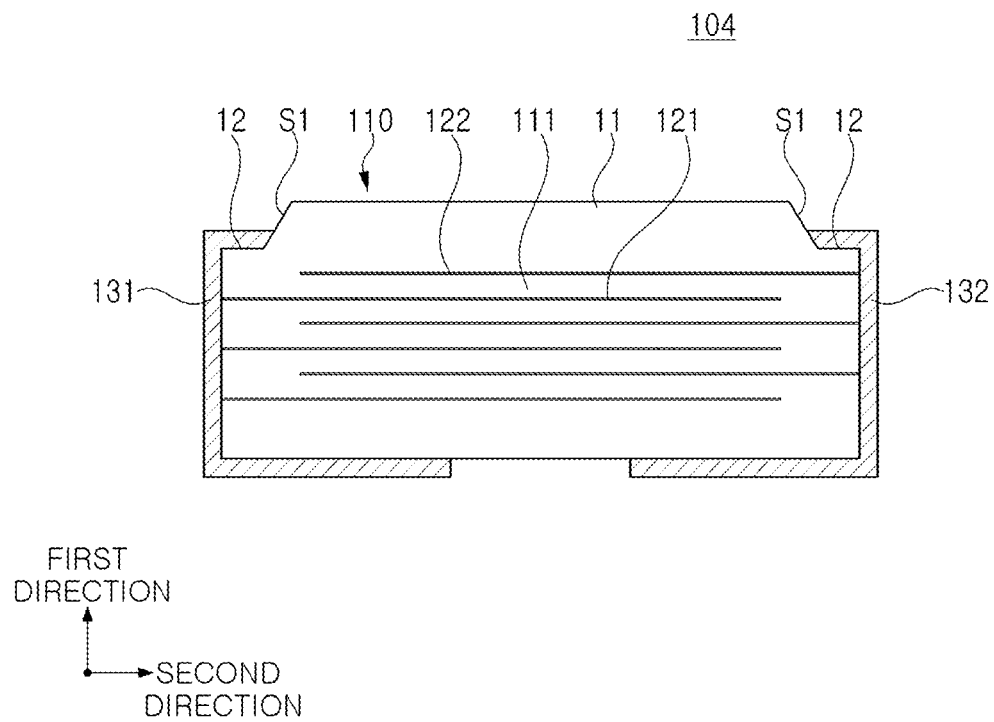
FIG. 8 is a cross-sectional view of a multilayer electronic component according to an exemplary embodiment in the first direction and the second direction.
Figure 9:
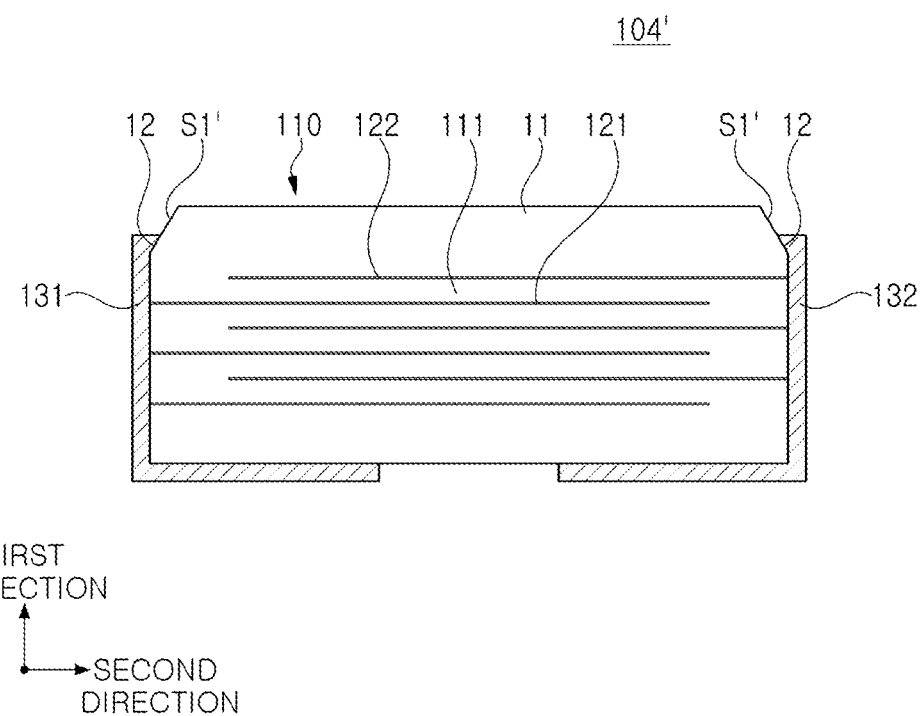
FIG. 9 is a cross-sectional view of a modification of the multilayer electronic component of FIG. 8 in the first direction and the second direction.

FIG. 8 is a cross-sectional view of a multilayer electronic component 104 according to another exemplary embodiment in the first direction and the second direction, and FIG. 9 is a cross-sectional view of a modification 104' of the multilayer electronic component 104 of FIG. 8 in the first direction and the second direction.

Referring to FIG. 8, a protruding portion 11 of a body 110 of the multilayer electronic component 104 according to an exemplary embodiment may have side surfaces S1 connected to outer peripheral portions 12.

The side surface S1 may be defined as a surface connecting a distal end of the protruding portion 11 in the first direction and the outer peripheral portion 12, and may have a straight line shape when viewed in a cross section in the first direction and the second direction.

The side surface S1 of the multilayer electronic component 104 according to an exemplary embodiment may correspond to a substantially flat shape inclined by a predetermined angle with respect to the first direction. That is, the protruding portion 11 may have a tapered shape in which a length in the second direction is gradually decreased from the outer peripheral portion 12 toward the distal end of the protruding portion 11 in the first direction. Accordingly, a contact area between the external electrodes 131 and 132 and the side surfaces S1 of the protruding portion 11 may be increased to increase an adhesion between the external electrodes 131 and 132 and the body 110, thereby improving the strength of the multilayer electronic component 104.

Meanwhile, the outer peripheral portion 12 may also be a substantially flat surface having a constant inclination, and in a case in which an inclination of the side surface S1 and the inclination of the outer peripheral portion 12 are different from each other as illustrated in FIG. 9, the side surface S1 and the outer peripheral portion 12 may form a step shape.

Referring to FIG. 9, in the modification 104' of the multilayer electronic component 104 illustrated in FIG. 8, an inclination of a side surface S1' and the inclination of the outer peripheral portion 12 may be substantially the same as each other. That is, the side surface S1' and the outer peripheral portion 12 may be formed as substantially one flat surface. Accordingly, an adhesion between the external electrodes 131 and 132 and the body 110 may be increased to improve the strength of the multilayer electronic component 104', and sizes of regions of the external electrodes 131 and 132 that cover the outer peripheral portions 12 may also be significantly reduced, thereby further increasing a capacitance per unit volume of the multilayer electronic component 104'.

Figure 10:
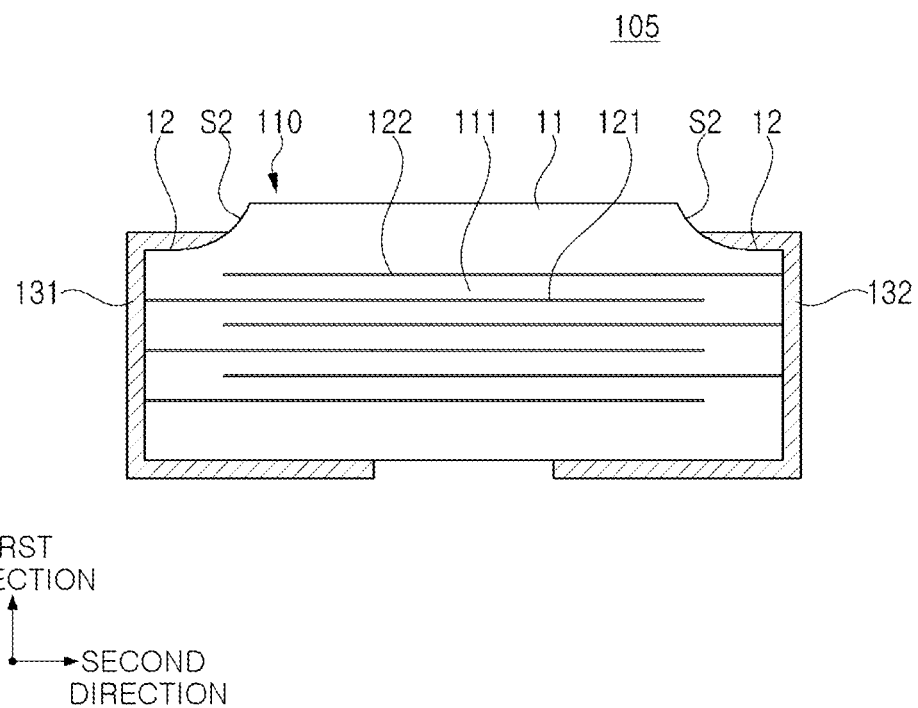
FIG. 10 is a cross-sectional view of a multilayer electronic component according to an exemplary embodiment in the first direction and the second direction.
Figure 11:
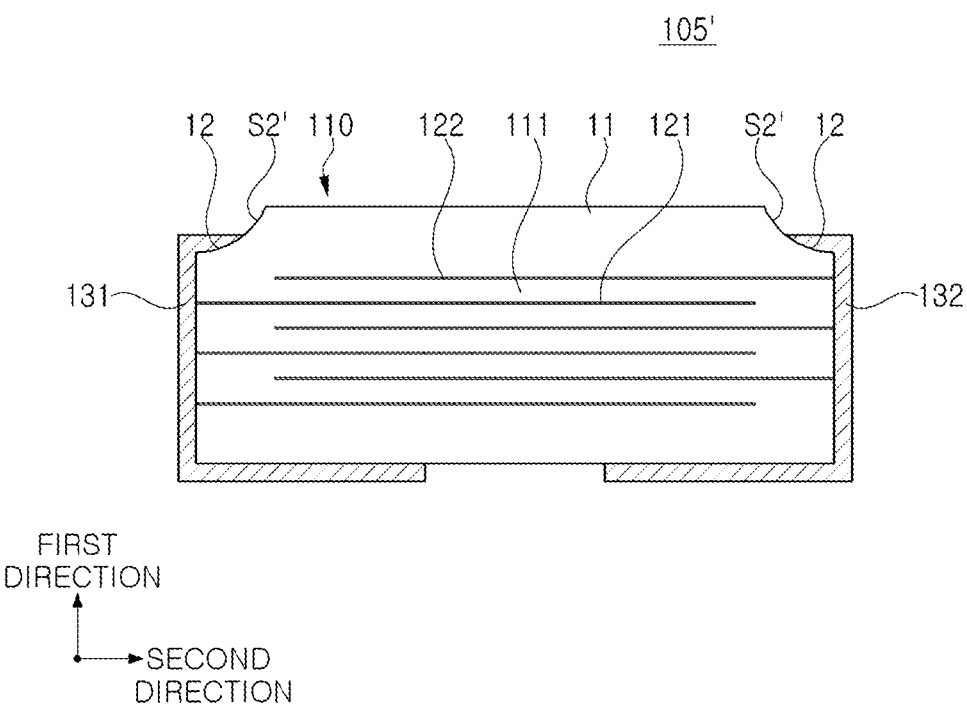
FIG. 11 is a cross-sectional view of a modification of the multilayer electronic component of FIG. 10 in the first direction and the second direction.

FIG. 10 is a cross-sectional view of a multilayer electronic component 105 according to another exemplary embodiment in the first direction and the second direction, and FIG. 11 is a cross-sectional view of a modification 105' of the multilayer electronic component 105 of FIG. 10 in the first direction and the second direction.

Referring to FIG. 10, a protruding portion 11 of a body 110 of the multilayer electronic component 105 according to an exemplary embodiment may have curved side surfaces S2 connected to outer peripheral portions 12. The side surface S2 may have a curved shape having a radius of curvature when viewed in a cross section in the first direction and the second direction. In addition, since the side surface S2 has a curved shape, it is easier to increase a bonding area with external electrodes 131 and 132 than in a case in which the side surface S2 has a straight shape. Therefore, the strength of the multilayer electronic component 105 may be further improved.

Referring to FIG. 11, in the modification 105' of the multilayer electronic component 105 illustrated in FIG. 10, the outer peripheral portion 12 may also be a curved surface having a radius of curvature, and a radius of curvature of a side surface S2' and the radius of curvature of the outer peripheral portion 12 may be substantially the same as each other. That is, the side surface S2' and the outer peripheral portion 12 may be formed as substantially one curved surface. Accordingly, the strength of the multilayer electronic component 105' may be further improved, and sizes of regions of the external electrodes 131 and 132 that cover the outer peripheral portions 12 may also be significantly reduced, thereby further increasing a capacitance per unit volume of the multilayer electronic component 105'.

Meanwhile, although the protruding portion 11 is formed only at the first surface 1 of the body 110 in the above-described exemplary embodiments, the protruding portion may also be formed at the second surface 2. In this case, protruding portions 11 and 21 of the first and second surfaces 1 and 2 may have different shapes from each other. This will be described with reference to FIGS. 12 through 14. First, FIG. 12 is a cross-sectional view of a multilayer electronic component 106 according to another exemplary embodiment in the first direction and the second direction, and FIG. 13 is a cross-sectional view of a multilayer electronic component 107 according to another exemplary embodiment in the first direction and the second direction.

Figure 12:
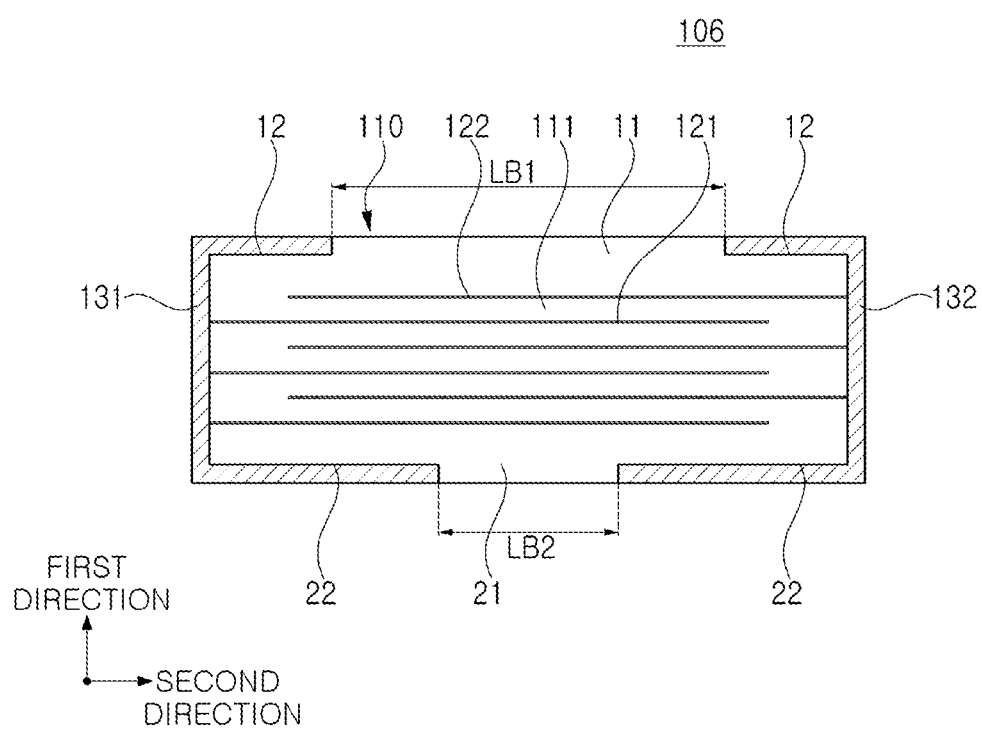
FIG. 12 is a cross-sectional view of a multilayer electronic component according to an exemplary embodiment in the first direction and the second direction.
Figure 13:
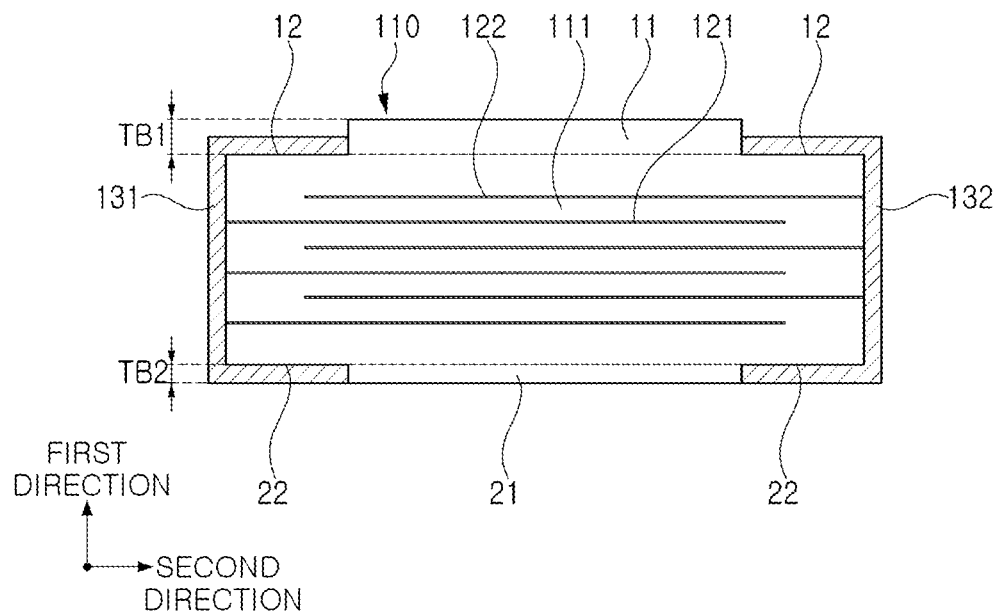
FIG. 13 is a cross-sectional view of a multilayer electronic component according to an exemplary embodiment in the first direction and the second direction.

Referring to FIGS. 12 and 13, each of the multilayer electronic components 106 and 107 according to exemplary embodiments may include a body 110 including dielectric layers 111 and internal electrodes 121 and 122 alternately disposed with the dielectric layers interposed therebetween in the first direction, and external electrodes 131 and 132 connected to the internal electrodes, in which a first protruding portion 11 and first outer peripheral portions 12 may be formed at a first surface 1 of the body 110, a second protruding portion 21 protruding in the first direction and second outer peripheral portions 22 around the second protruding portion may be formed at a second surface 2 of the body 110, and the first and second protruding portions 11 and 21 may have different shapes.

Meanwhile, in a case in which the first and second protruding portions 11 and 21 having different shapes are respectively formed on the first surface 1 and the second surface 2, the external electrodes 131 and 132 may be disposed the first and second outer peripheral portions 12 and 22, and shapes of portions of the external electrodes 131 and 132 that are disposed on the first outer peripheral portions 12, and shapes of portions of the external electrodes 131 and 132 that are disposed on the second outer peripheral portions 22 may also be different from each other.

Specifically, in a case in which the shapes of the first and second protruding portions 11 and 21 are different from each other, a length LB1 of the first protruding portion 11 in the second direction perpendicular to the first direction and a length LB2 of the second protruding portion 21 in the second direction may be different from each other, or a thickness TB1 of the first protruding portion 11 in the first direction and a thickness TB2 of the second protruding portion 21 in the first direction may be different from each other.

LE1 and LE2 may be the lengths of the protruding portions 11 and 21 in the second direction, the lengths being measured in a cross section of a central portion of the body 110 in the third direction in the first direction and the second direction. Further, TB1 and TB2 may be the thicknesses of the protruding portions 11 and 21 in the first direction, the lengths being measured in the cross section of the central portion of the body 110 in the third direction in the first direction and the second direction.

That is, referring to FIG. 12, the lengths LB1 and LB2 of the first and second protruding portions 11 and 21 of the multilayer electronic component 106 according to an exemplary embodiment in the second direction perpendicular to the first direction may be different from each other. Further, referring to FIG. 13, the thicknesses TB1 and TB2 of the first and second protruding portions 11 and 21 of the multilayer electronic component 107 according to an exemplary embodiment in the first direction may be different from each other.

In the multilayer electronic components 106 and 107 according to FIGS. 12 and 13, as the protruding portions (11 and 21) are formed at both the first surface 1 and the second surface 2 of the body 110, a proportion of the external electrodes 131 and 132 in the entire component may be significantly reduced to further increase a capacitance per unit volume of each of the multilayer electronic components 106 and 107, and since the shapes of the first and second protruding portions 11 and 21 are different from each other, it is easy to identify upper and lower surfaces of the multilayer electronic components 106 and 107, which is advantageous.

In a case in which the protruding portions (11 and 21) and the outer peripheral portions (12 and 22) are formed at both the first surface 1 and the second surface 2 of the body 110 as in the multilayer electronic components 106 and 107 according to exemplary embodiments, the external electrodes 131 and 132 may cover not only the side surfaces 3 and 4 and the first outer peripheral portions 12 of the body 110, but also the second outer peripheral portions 22. That is, according to an exemplary embodiment, the external electrodes 131 and 132 may also be disposed on the second outer peripheral portions 22 of the body 110, and accordingly, both of the first and second surfaces 1 and 2 of the body 110 may become the mounting surface when the multilayer electronic component is mounted on a board. Therefore, the degree of freedom in mounting may be increased. In addition, as the external electrodes 131 and 132 are disposed on the outer peripheral portions 12 and 22, the capacitance per unit volume of each of the multilayer electronic components 106 and 107 may be increased.

Figure 14:
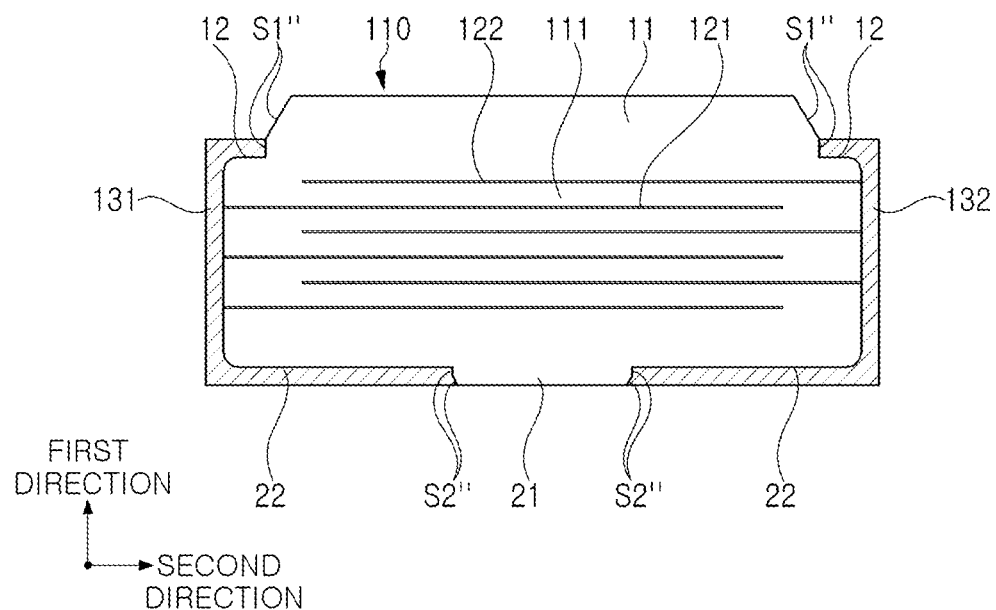
FIG. 14 is a cross-sectional view of a multilayer electronic component according to an exemplary embodiment in the first direction and the second direction.

FIG. 14 is a cross-sectional view of a multilayer electronic component 108 according to an exemplary embodiment in the first direction and the second direction.

Referring to FIG. 14, a corner of a body 110 of the multilayer electronic component 108 according to an exemplary embodiment may be rounded.

As a margin region in which internal electrodes 121 and 122 are not disposed is overlappingly provided on dielectric layers 111, a step is generated due to the thicknesses of the internal electrodes 121 and 122, and thus, corners connecting a first surface 1 and side surfaces 3, 4, 5, and 6 and/or corners connecting a second surface 2 and the side surface 3, 4, 5, and 6 may have a contracted shape toward the center of the body 110 in the first direction when viewed with respect to the first surface 1 or the second surface 2. The corners connecting the first surface 1 and the side surfaces 3, 4, 5, and 6 and/or the corners connecting the second surface 2 and the side surface 3, 4, 5, and 6 may have a contracted shape toward the center of the body 110 in the first direction when viewed with respect to the first surface or the second surface, due to shrinkage in sintering of the body. The corners connecting the first surface 1 and the side surfaces 3, 4, 5, and 6 and/or the corners connecting the second surface 2 and the side surface 3, 4, 5, and 6 may be rounded by performing a separate process to prevent chipping defects or the like.

A first protruding portion 11 protruding in the first direction and first outer peripheral portions 12 around the first protruding portion 11 may be formed at the first surface 1 of the multilayer electronic component 108, and a second protruding portion 21 protruding in the first direction and second outer peripheral portions 22 around the second protruding portion 21 may be formed at the second surface 2.

The first protruding portion 11 may have first side surfaces S1" connected to the first outer peripheral portions 12, and the second protruding portion 21 may have second side surfaces S2" connected to the second outer peripheral portions 22.

The first and second side surfaces S1" and S2" may correspond to substantially inclined flat surfaces forming a predetermined angle with the first direction, and may be a plurality of flat surfaces having different inclinations as illustrated in FIG. 14.

The first and second side surfaces S1" and S2" are illustrated as flat surfaces in FIG. 14 but are not limited thereto, and the first and second side surfaces S1" and S2" may be a plurality of curved surfaces depending on a process of forming the protruding portions 11 and 21 and the outer peripheral portions 12 and 22.

Figure 15A:
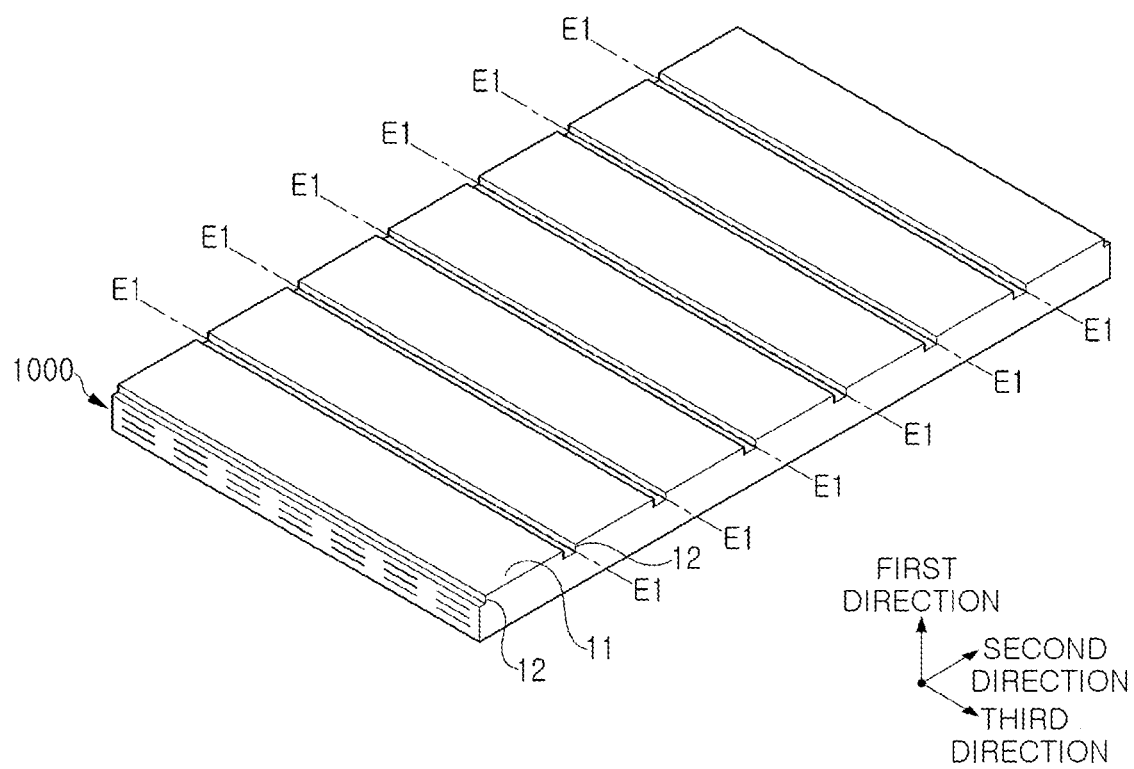
FIGS. 15A, 15B, and 15C are perspective views and a cross-sectional view schematically illustrating a method of manufacturing the multilayer electronic component according to an exemplary embodiment in the present disclosure.
Figure 15B:
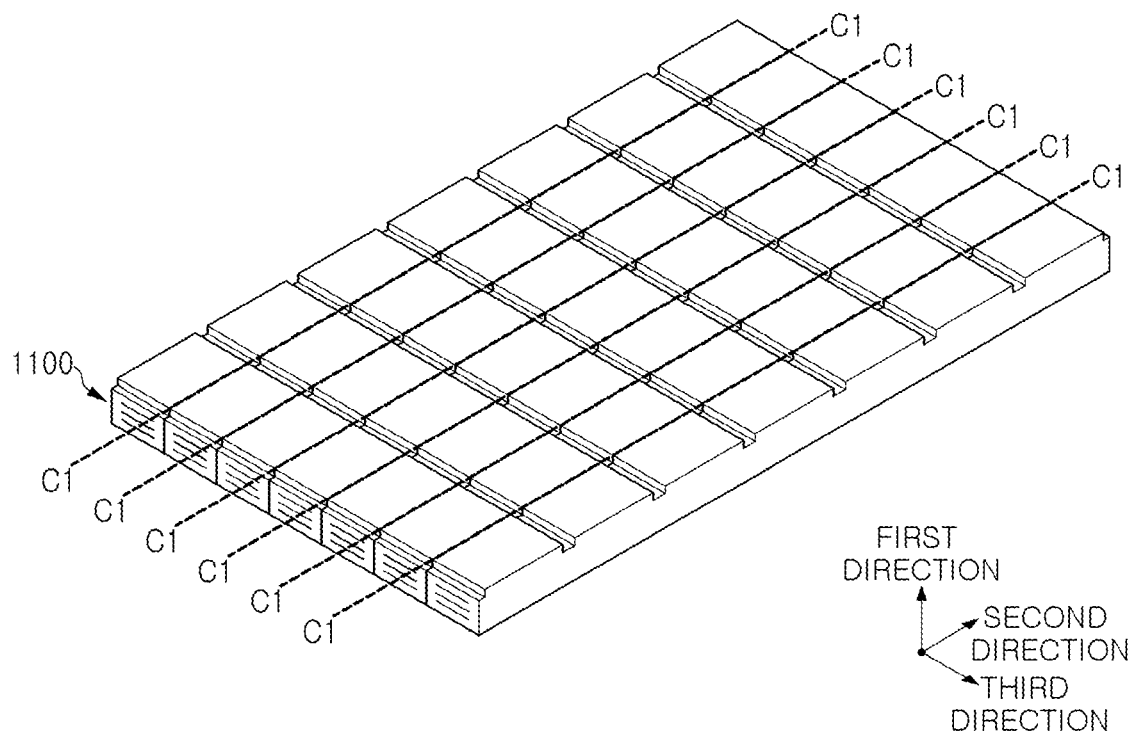
Figure 15C:
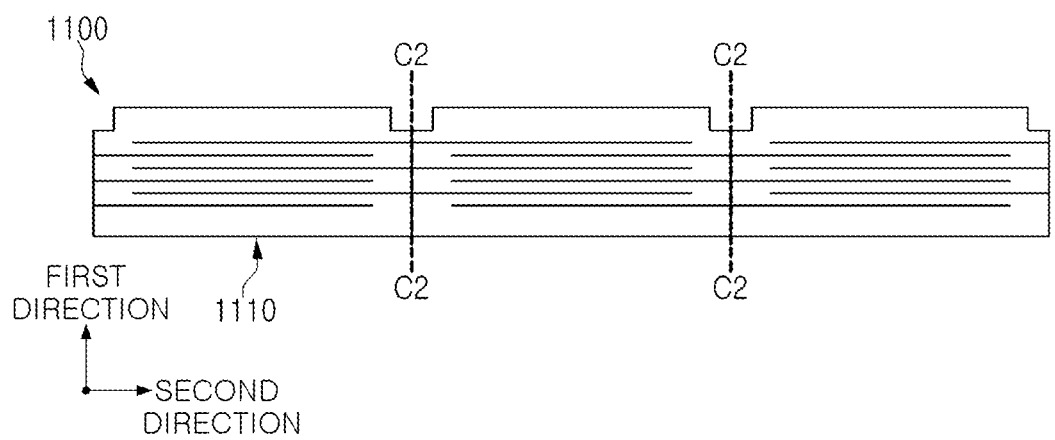

FIGS. 15A, 15B, and 15C are perspective views and a cross-sectional view schematically illustrating a method of manufacturing the multilayer electronic component 100 according to an exemplary embodiment in the present disclosure.

Referring to FIG. 15A, a surface of a ceramic green sheet laminate 1000 formed by alternately stacking and pressing first ceramic green sheets on which a plurality of first internal electrode patterns are printed and second ceramic green sheets on which a plurality of second internal electrode patterns are printed is cut or etched along a plurality of E1-E1 lines that are parallel in the third direction and arranged at substantially the same intervals with a dicing blade, laser irradiation, chemical etching, or the like to form the protruding portions 11 and the outer peripheral portions 12. In this case, cutting or etching may mean removing a portion of the dielectric layer of the ceramic green sheet laminate 1000 by cutting or etching the surface in the first direction, rather than completely cutting the ceramic green sheet laminate 1000.

Next, referring to FIG. 15B, the ceramic green sheet laminate 1000 in which the protruding portions and the outer peripheral portions are formed may be cut along a plurality of cutting lines C1-C1 that are parallel in the second direction and arranged at substantially the same intervals to form laminates 1100 having a uniform width. Here, the lines E1-E1 of FIG. 15A and the cutting lines C1-C1 of FIG. 15B may be at the same positions.

Next, referring to FIG. 15C, individual ceramic chips 1110 may be formed by cutting the cut laminate 1100 along a plurality of cutting lines C2-C2 that are parallel in the third direction and arranged at substantially the same intervals. Here, the cutting line C2-C2 may be orthogonal to the cutting lines C1-C1 of FIG. 15A.

Thereafter, the body 110 according to the present disclosure may be formed through sintering, but the method is not limited thereto, and the body 110 according to the present disclosure may be formed by additionally performing a step of attaching a separate margin portion and then performing sintering.

Then, the external electrodes may be respectively formed on the side surfaces of the body 110 to which the internal electrodes may extend to complete the multilayer electronic component 100 according to an exemplary embodiment in the present disclosure.

As set forth above, according to the exemplary embodiment in the present disclosure, the capacitance per unit volume of the multilayer electronic component may be increased by significantly reducing the proportion of the external electrodes in the entire component.

In addition, the moisture resistance reliability of the multilayer electronic component may be improved by preventing formation of the distal ends of the external electrodes that are vulnerable to external impact or penetration of moisture while significantly reducing the proportion of the external electrodes in the entire component.

While exemplary embodiments have been shown and described above, it will be apparent to those skilled in the art that modifications and variations could be made without departing from the scope of the present disclosure as defined by the appended claims.

What is claimed is:

1. A multilayer electronic component comprising:
a body including dielectric layers and internal electrodes alternately disposed with the dielectric layers interposed therebetween in a first direction; and
external electrodes connected to the internal electrodes,
wherein the body has first and second surfaces opposing each other in the first direction and one or more side surfaces positioned between the first and second surfaces,
the body has a protruding portion protruding in the first direction and outer peripheral portions around the protruding portion on the first surface of the body,
the external electrodes cover the outer peripheral portions, the side surfaces, and the second surface of the body,
in the second surface of the body, portions that are covered by the external electrodes and a portion that is not covered by the external electrodes are substantially coplanar with each other, and
respective uppermost surfaces of the external electrodes are lower than an uppermost surface of the protruding portion in the first direction.

2. The multilayer electronic component of claim 1, wherein areas of the first surface and the second surface of the body covered by each of the external electrodes are different from each other.

3. The multilayer electronic component of claim 2, wherein the area of the second surface of the body covered by each of the external electrodes is larger than the area of the first surface of the body covered by each of the external electrodes.

4. The multilayer electronic component of claim 1, wherein regions of the external electrodes disposed on the outer peripheral portions of the body are in contact with side surfaces of the protruding portion.

5. The multilayer electronic component of claim 1, further comprising insulating layers disposed on side surfaces of the external electrodes.

6. The multilayer electronic component of claim 5, wherein the insulating layers extend from the side surfaces of the external electrodes to portions of the external electrodes that are disposed on the outer peripheral portions of the body.

7. The multilayer electronic component of claim 1, wherein areas of the first surface and the second surface of the body covered by each of the external electrodes are substantially the same as each other.

8. The multilayer electronic component of claim 1, wherein the external electrodes do not cover the protruding portion of the body in the first direction.

9. The multilayer electronic component of claim 1, wherein the protruding portion of the body has curved side surfaces connected to the outer peripheral portions.

10. The multilayer electronic component of claim 1, wherein the second surface of the body is a flat surface.

11. The multilayer electronic component of claim 1, wherein surfaces of portions of the external electrodes that cover the second surface of the body are positioned more toward the outside in the first direction than a portion of the second surface of the body that is not covered by the external electrodes.

12. The multilayer electronic component of claim 1, wherein
surfaces of portions of the external electrodes that cover the second surface of the body are positioned more toward the outside in the first direction than a portion of the second surface of the body that is not covered by the external electrodes.

13. The multilayer electronic component of claim 1, wherein the internal electrodes extend to the side surfaces of the body.

14. A multilayer electronic component comprising:
a body including dielectric layers and internal electrodes alternately disposed with the dielectric layers interposed therebetween in a first direction; and
external electrodes connected to the internal electrodes,
wherein the body has first and second surfaces opposing each other in the first direction and one or more side surfaces positioned between the first and second surfaces,
the body includes a first protruding portion protruding in the first direction and first outer peripheral portions around the first protruding portion on the first surface of the body,
the body includes a second protruding portion protruding in the first direction and second outer peripheral portions around the second protruding portion on the second surface of the body, and
the first protruding portion and the second protruding portion have different shapes from each other.

15. The multilayer electronic component of claim 14, wherein lengths of the first and second protruding portions in a second direction perpendicular to the first direction are different from each other.

16. The multilayer electronic component of claim 14, wherein thicknesses of the first and second protruding portions in the first direction are different from each other.

17. The multilayer electronic component of claim 14, wherein the external electrodes are disposed on the side surfaces, the first periphery portions, and the second periphery portions of the body.

18. A multilayer electronic component comprising:
a body including dielectric layers and internal electrodes alternately disposed with the dielectric layers interposed therebetween in a first direction; and
an external electrode connected to one or more of the internal electrodes,
wherein the body has first and second surfaces opposing each other in the first direction and a side surface positioned between the first and second surfaces,
the external electrode is disposed on the side surface and includes a first portion and a second portion at least partially overlapping each other in the first direction,
a center portion of the first surface protrudes with respect to the first portion in the first direction such that an uppermost surface of the first portion is lower than an uppermost surface of the center portion in the first direction, and
the second portion of the external electrode extends on the second surface, and protrudes with respect to a center portion of the second surface in the first direction.

19. The multilayer electronic component of claim 18, wherein an area of the first portion and an area of the second portion are different from each other.

20. The multilayer electronic component of claim 19, wherein the area of the first portion is less than the area of the second portion.

21. The multilayer electronic component of claim 18, further comprising an insulating layer disposed on a side surface of the external electrode.

22. The multilayer electronic component of claim 21, wherein the insulating layer extends from the side surface of the external electrode to cover the first portion.

23. The multilayer electronic component of claim 18, wherein the second surface of the body is a flat surface.

24. A multilayer electronic component comprising:
a body including dielectric layers and internal electrodes alternately disposed with the dielectric layers interposed therebetween in a first direction; and
an external electrode connected to one or more of the internal electrodes,
wherein the body has first and second surfaces opposing each other in the first direction and a side surface positioned between the first and second surfaces,
the body includes a first protruding portion protruding in the first direction and first outer peripheral portions disposed on opposing sides of the first protruding portion in a second direction,
the external electrode is disposed on the side surface of the body, and extends to be in contact with, and ends at, a side surface of the first protruding portion, and
an uppermost surface of the external electrode is lower than an uppermost surface of the first protruding portion in the first direction.

25. The multilayer electronic component of claim 24, further comprising an insulating layer disposed on a side surface of the external electrode.

26. The multilayer electronic component of claim 25, wherein the insulating layer extends from the side surface of the external electrode to cover a first outer peripheral portion of the first outer peripheral portions.

27. The multilayer electronic component of claim 26, wherein the insulating layer extends to be in contact with, and ends at, the side surface of the first protruding portion.

28. The multilayer electronic component of claim 24, wherein the second surface of the body is a flat surface.

29. The multilayer electronic component of claim 24, wherein the body further includes a second protruding portion protruding in the first direction and second outer peripheral portions disposed on opposing sides of the second protruding portion in the second direction, and
the external electrode extends to be in contact with, and ends at, a side surface of the second protruding portion.

30. The multilayer electronic component of claim 29, wherein lengths of the first and second protruding portions in the second direction are different from each other.

31. The multilayer electronic component of claim 29, wherein thicknesses of the first and second protruding portions in the first direction are different from each other.

* * * * *